United States Patent
Yoon et al.

(10) Patent No.: US 9,779,264 B2
(45) Date of Patent: Oct. 3, 2017

(54) METHOD, SERVER AND COMPUTER PROGRAM FOR SECURITY MANAGEMENT IN DATABASE

(71) Applicant: TmaxData Co., Ltd, Gyeonggi-Do (KR)

(72) Inventors: Jeong Il Yoon, Gyeonggi-Do (KR); Sang Young Park, Gyeonggi-Do (KR)

(73) Assignee: TmaxData Co., Ltd. (KR)

( * ) Notice: Subject to any disclaimer, the term of this patent is extended or adjusted under 35 U.S.C. 154(b) by 0 days.

(21) Appl. No.: 14/733,819

(22) Filed: Jun. 8, 2015

(65) Prior Publication Data
US 2016/0285623 A1   Sep. 29, 2016

(30) Foreign Application Priority Data

Mar. 24, 2015   (KR) ........................ 10-2015-0040583

(51) Int. Cl.
*G06F 21/00* (2013.01)
*G06F 21/62* (2013.01)

(52) U.S. Cl.
CPC ...... *G06F 21/6227* (2013.01); *G06F 21/6218* (2013.01); *G06F 21/6236* (2013.01); *G06F 21/6245* (2013.01)

(58) Field of Classification Search
None
See application file for complete search history.

(56) References Cited

U.S. PATENT DOCUMENTS

| | | | |
|---|---|---|---|
| 7,111,005 B1 * | 9/2006 | Wessman | G06F 21/6227 |
| 7,639,819 B2 | 12/2009 | Ho et al. | |
| 8,949,603 B2 | 2/2015 | Moon | |
| 8,997,041 B2 | 3/2015 | Lee | |
| 9,071,884 B2 | 6/2015 | Joung | |
| 2002/0174355 A1 * | 11/2002 | Rajasekaran | G06F 17/30964 713/193 |
| 2006/0041533 A1 * | 2/2006 | Koyfman | G06F 17/30312 |
| 2008/0215539 A1 * | 9/2008 | Barsness | G06F 17/30463 |

(Continued)

FOREIGN PATENT DOCUMENTS

| | | |
|---|---|---|
| KR | 10-2006-0037196 | 5/2006 |
| KR | 10-2006-0058546 | 5/2006 |

(Continued)

OTHER PUBLICATIONS

Cyran, Michele, "Oracle® Database Concepts 10g Release 2 (10.2) B14220-02", 542 Pages. Oct. 2005. Copyright 1993, 2005, Oracle.

(Continued)

*Primary Examiner* — Hadi Armouche
*Assistant Examiner* — Andrew Steinle
(74) *Attorney, Agent, or Firm* — Rutan & Tucker LLP

(57) ABSTRACT

Disclosed is a program for security management in a database, which is stored in a computer readable medium to allow a computer to perform steps including: reading one or more data encrypted at a column level from a persistent storage medium or a memory; decrypting one or more data encrypted at the column level to generate one or more decrypted data; generating an index table based on the one or more generated decrypted data; and performing an operation of encrypting the generated index table at a block level.

17 Claims, 8 Drawing Sheets

(56) References Cited

U.S. PATENT DOCUMENTS

| | | | |
|---|---|---|---|
| 2010/0169665 A1* | 7/2010 | Kang | G06F 17/30321 |
| | | | 713/189 |
| 2010/0250958 A1* | 9/2010 | Browning | G06F 21/6227 |
| | | | 713/189 |
| 2012/0328105 A1* | 12/2012 | Mukkara | H04L 9/0897 |
| | | | 380/277 |
| 2015/0143112 A1* | 5/2015 | Yavuz | G06F 17/3033 |
| | | | 713/165 |

FOREIGN PATENT DOCUMENTS

| | | |
|---|---|---|
| KR | 10-2009-0068242 | 6/2009 |
| KR | 10-2013-0039354 | 4/2013 |
| WO | WO 2008/048748 | 4/2008 |

OTHER PUBLICATIONS

Huey, Patricia, "Oracleu® Database 2 Day + Security Guide, 11g Release 2 (11.2) E10575-09", 124 Pages. Nov. 2013. Copyright 2006, 2013, Oracle.

Korean Office Action issued in co-pending KR Patent Application No. 120030349901, dated May 21, 2015, (5 pgs) with English translation of same (2 pgs).

* cited by examiner

METHOD, SERVER AND COMPUTER PROGRAM FOR SECURITY MANAGEMENT IN DATABASE

RELATED APPLICATIONS

This application is related to and claims the benefit under the Paris Convention of South Korean Application No. KR 10-2015-0040583 titled "METHOD, SERVER AND COMPUTER PROGRAM FOR SECURITY MANAGEMENT IN DATABASE," filed Mar. 24, 2015, which is incorporated herein by reference in its entirety.

FIELD

The present invention relates to security management in a database, and more particularly, to a method, a server and a computer program for generating an index for an encrypted database.

BACKGROUND

With the development of computer and Internet technology, the importance of databases for efficiently storing a large quantity of data and easily and rapidly retrieving the stored data by using a desired search condition has increased. Current database systems permit numerous information to be stored and searched. Some of the information may include sensitive information such as credit card numbers, and the like.

In particular, security of a database that collects and manages personal information in the financial sector, Internet portal sites, and the like is obligatorily required, to prevent provision of an information processing service to a user having proper authority from being rejected by a computer system and guarantee integrity, confidentiality, and availability of data in a database management system storing mass data, in order to prevent a user having no authority from obtaining or improperly writing information processed by a computer.

In recent years, information leakage by exposure of an encryption key by a server administrator or a developer of a database has been a serious problem. That is, with a gradual increase of the degree of information integration, the quantity of information accumulated in a database that exists in an enterprise has increased in proportion thereto, and as a result, when client information (residential registration numbers, phone numbers, account numbers, and the like) contained in a client information database managed by a communication company leaks through an illegal route, the ripple effect from the damage has become huge.

The leakage of the data may occur due to hacking by a hacker outside the enterprise, physical access to a data storage space, and the like, but most information leakage substantially occurs due to an internal person (for example, a database administrator) having valid access authority to the database and information leakage due to an internal person may cause more serious and critical damage than a hacking accident which occurs from outside.

The prior art that administrates database security restricts access to specific information by a specific user by using an access control scheme prescribed in a security profile allocated to respective clients. The technology may prevent a client from accessing unlicensed information. However, the prior art has a disadvantage in that an illegal action of an internal person (for example, database administrator) having valid access authority or a person having OS privilege cannot be prevented.

SUMMARY

In order to solve the problem, a scheme that encrypts confidential information in a user application is proposed, but in the case of the scheme, since all user applications handling the confidential information need to be encrypted/decrypted, there may be inconvenience that encryption/decryption codes in all of the user applications need to be provided.

Moreover, as another piece of prior art, a technique is presented, which encrypts column data of a database table (column-level encryption) and stores the encrypted data in a disk. The prior art permits the user to view unencrypted data because data is encrypted when being stored in the disk, but the data is decrypted when being uploaded to a memory. However, the prior art may have a problem in building an index generated based on a column value because encryption is implemented by the unit of a column. That is, since the index is generated based on the column value, when the column value itself is encrypted, an index range scan performed based on a value range may become impossible. That is, when the index range scan becomes impossible, an absolute influence on intrinsic performance of the database such as rapid and efficient search arises. In such a technique, only a unique search for just finding one value may become possible, but even in this case, when "salt" is used, a unique search may be impossible.

Therefore, a demand for a data security technique exists in the art, which can protect the confidential information in the database system in an efficient scheme and prevent an illegal action of the internal person without changing the user application.

The present invention is contrived by considering the aforementioned contents and the present invention has been made in an effort to provide a technique for protecting confidential information in an efficient scheme in a database system and maintaining intrinsic functions of a database.

The present invention has also been made in an effort to provide an efficient database security management technique which can permit index range scan.

Disclosed is a computer program according to an embodiment of the present invention for implementing the aforementioned object. The computer program is a program for security management in a database, which is stored in a computer readable medium to allow a computer to perform steps including: reading one or more data encrypted at a column level from a persistent storage medium or a memory; decrypting one or more data encrypted at the column level to generate one or more decrypted data; generating an index table based on the one or more generated decrypted data; and performing an operation of encrypting the generated index table at a block level.

According to an embodiment of the present invention, disclosed is a database server for security management in a database. The database server may include: at least one processor decrypting one or more data encrypted at a column level to generate one or more decrypted data, generating an index table based on the one or more decrypted data, and performing an operation of encrypting the generated index table at a block level; and a persistent storage medium storing a data table including the data encrypted at the column level and an index table encrypted at the block level.

According to another embodiment of the present invention, disclosed is a program for security management in a database, which is stored in a computer readable medium to allow a computer to perform the following steps. Herein, the steps may include: reading an index table encrypted at a block level from a persistent storage medium in response to an index inquiry request; decrypting the index table encrypted at the block level to generate the decrypted index table; performing index scan based on the decrypted index table; reading one or more data encrypted at a column level corresponding to a result of the index scan, from the persistent storage medium; and decrypting one or more data encrypted at the column level to generate one or more decrypted data.

According to another embodiment of the present invention, disclosed is a database server for providing security management in a database. The database server may include: at least one processor reading an index table encrypted at a block level from a persistent storage medium in response to an index inquiry request, decrypting the index table encrypted at the block level to generate the decrypted index table, performing index scan based on the decrypted index table, reading one or more data encrypted at a column level corresponding to a result of the index scan, from the persistent storage medium, and decrypting one or more data encrypted at the column level to generate one or more decrypted data; and a persistent storage medium storing a data table including the data encrypted at the column level and an index table encrypted at the block level.

According to the embodiments of the present invention, a data encryption technique for protecting confidential information in a database system by an efficient scheme and preventing an illegal action of an internal person without changing a user application can be provided.

According to the embodiments of the present invention, an efficient database security management technique can be provided, which can permit index range scan.

DESCRIPTION OF DRAWINGS

Various aspects are hereinafter disclosed with reference to drawings, and herein, similar reference numerals are used to designate generally similar elements. In the following embodiments, for the purpose of description, multiple specific details are presented to provide general understanding of one or more aspects. However, it will be apparent that the aspect(s) can be performed without the specific details. In other examples, known structures and devices are illustrated in a block diagram form in order to facilitate description of one or more aspects.

BRIEF DESCRIPTION OF THE DRAWINGS

Figure 1:
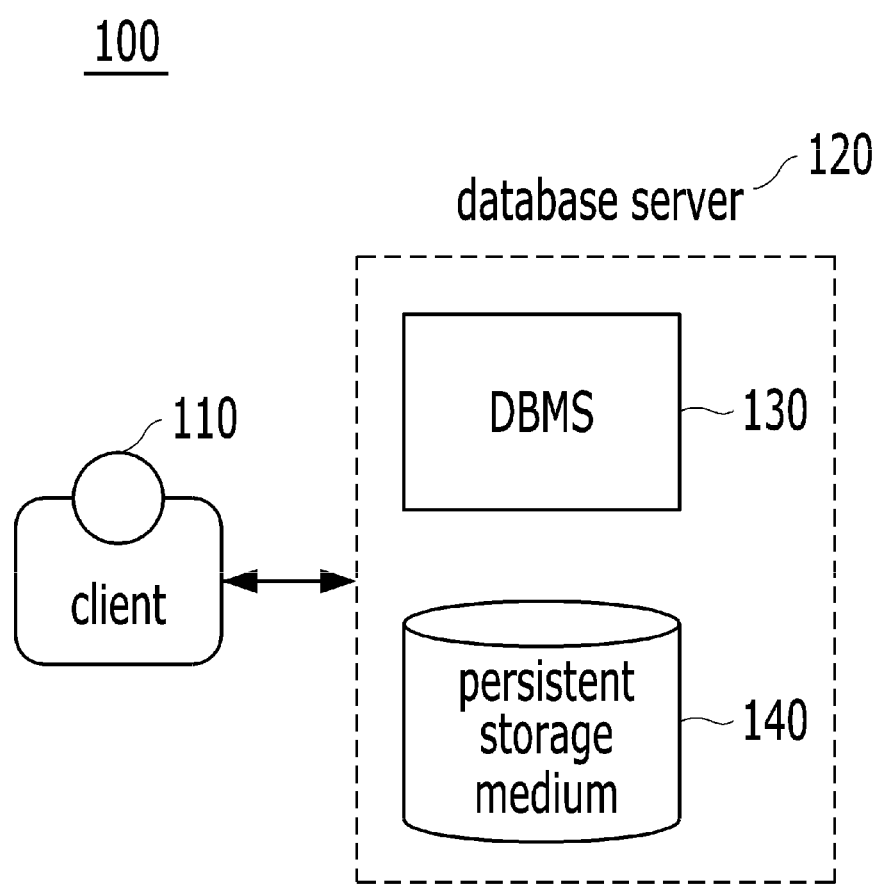

FIG. 1 exemplarily illustrates a database system according to an embodiment of the present invention.

Figure 2:
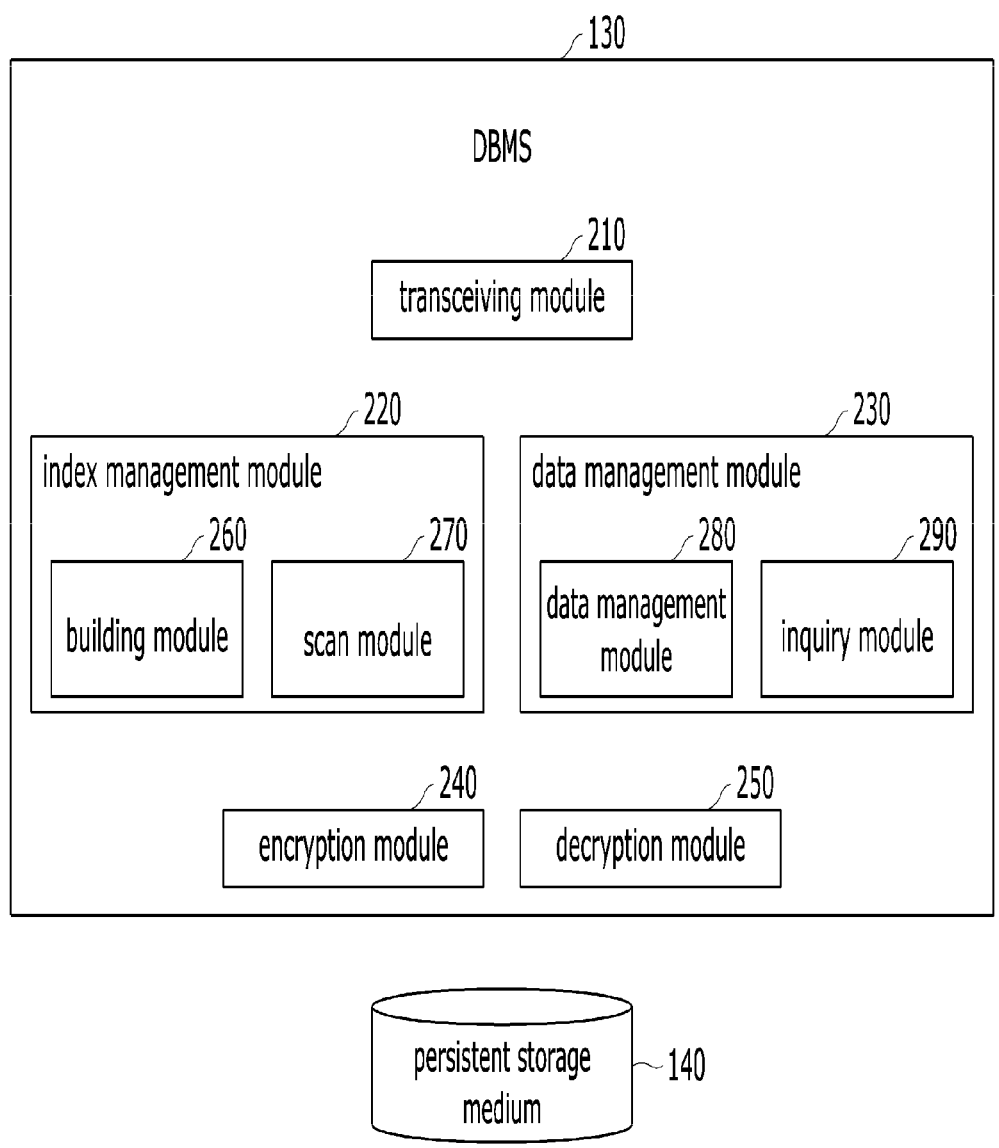

FIG. 2 exemplarily illustrates components of a database server according to the embodiment of the present invention.

Figure 3:
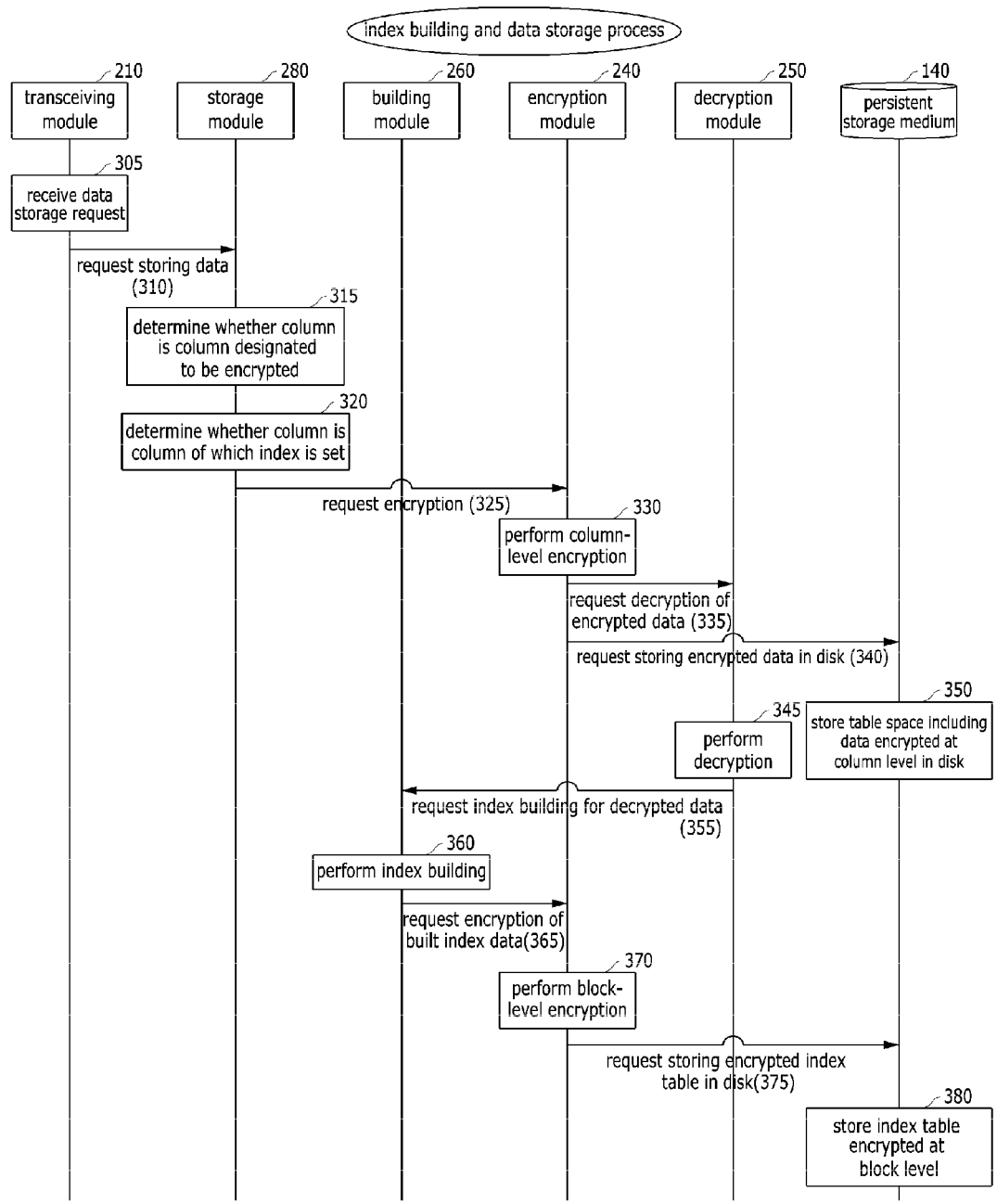

FIG. 3 illustrates an exemplary flowchart for a data storage and index building process according to an embodiment of the present invention.

Figure 4:
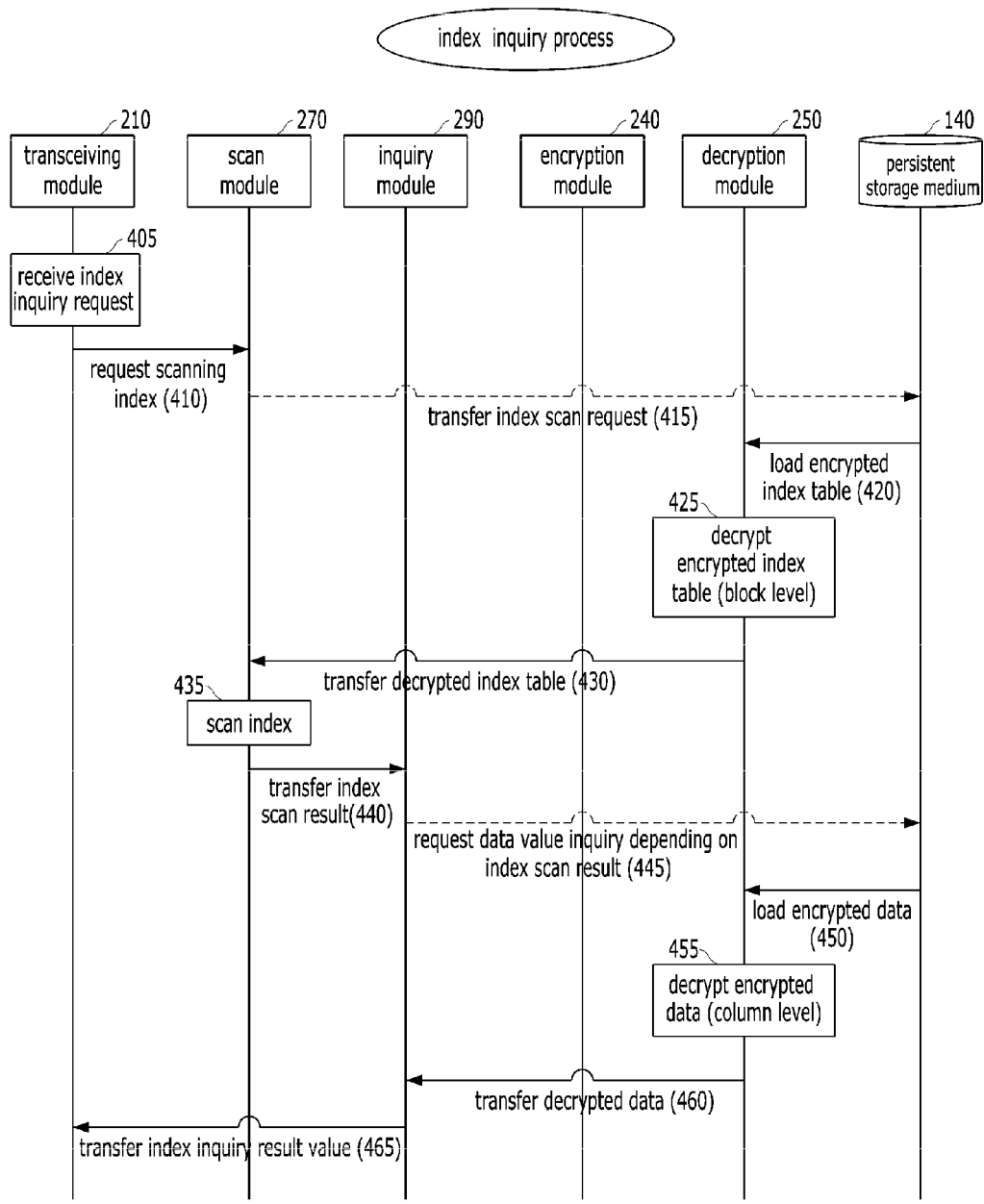

FIG. 4 illustrates an exemplary flowchart for an index scan and inquiry process according to an embodiment of the present invention.

Figure 5:
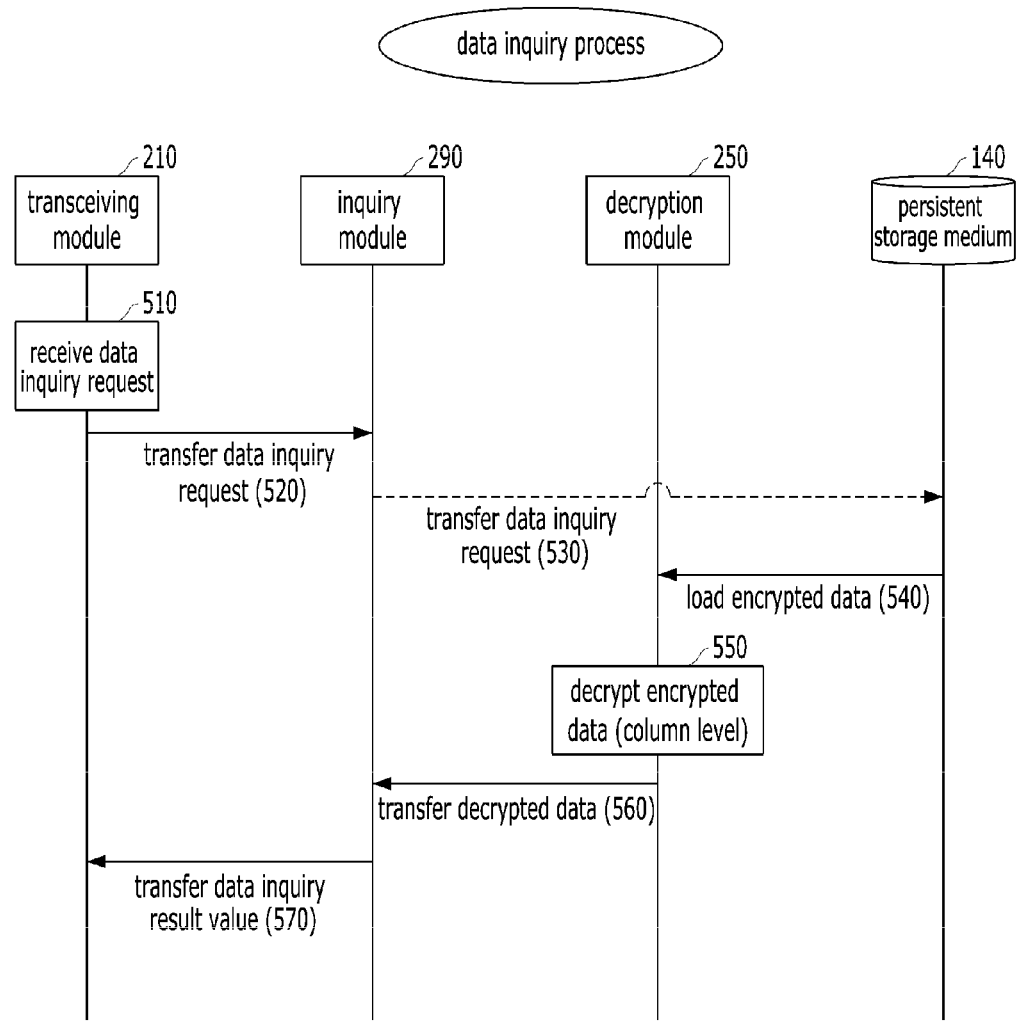

FIG. 5 illustrates an exemplary flowchart for a data inquiry process according to an embodiment of the present invention.

Figure 6:
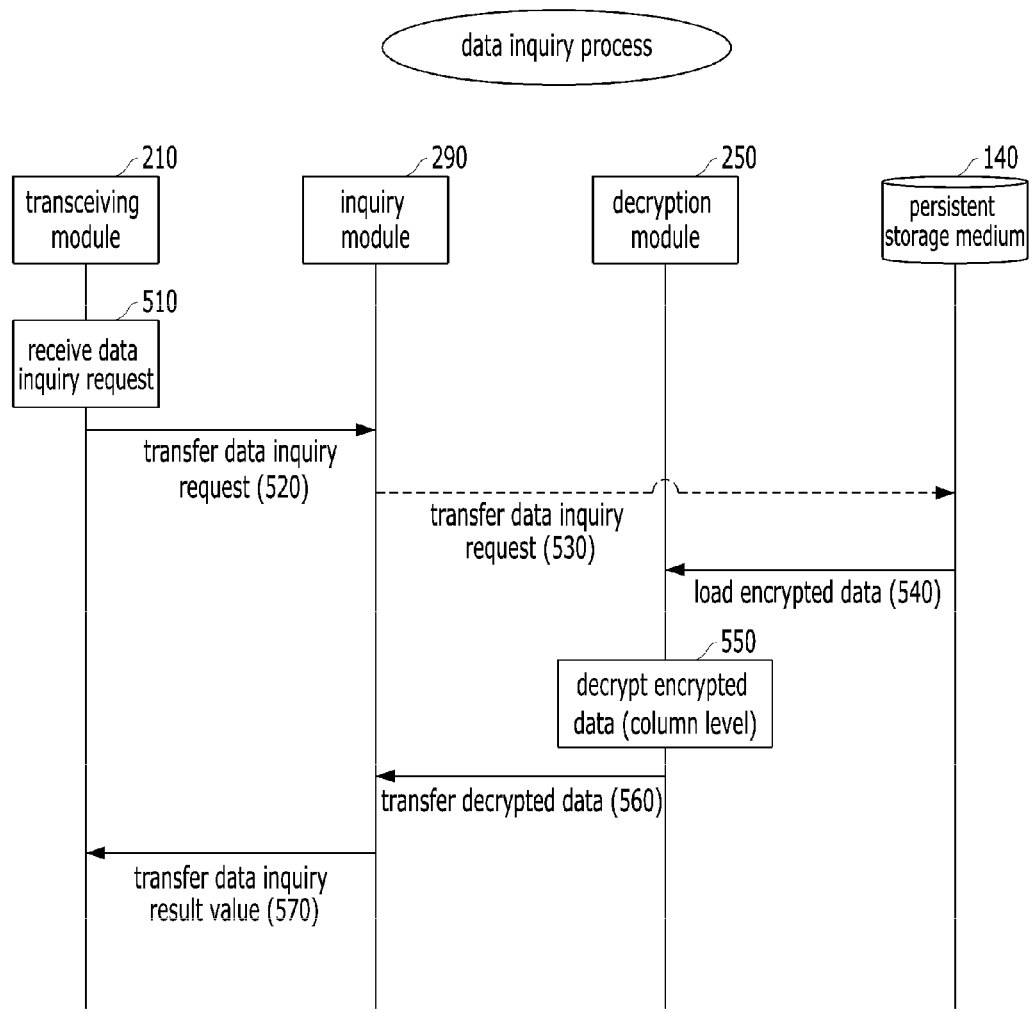

FIG. 6 exemplarily illustrates an encryption scheme in which data and indexes are encrypted and stored in a persistent storage medium according to an embodiment of the present invention.

Figure 7:
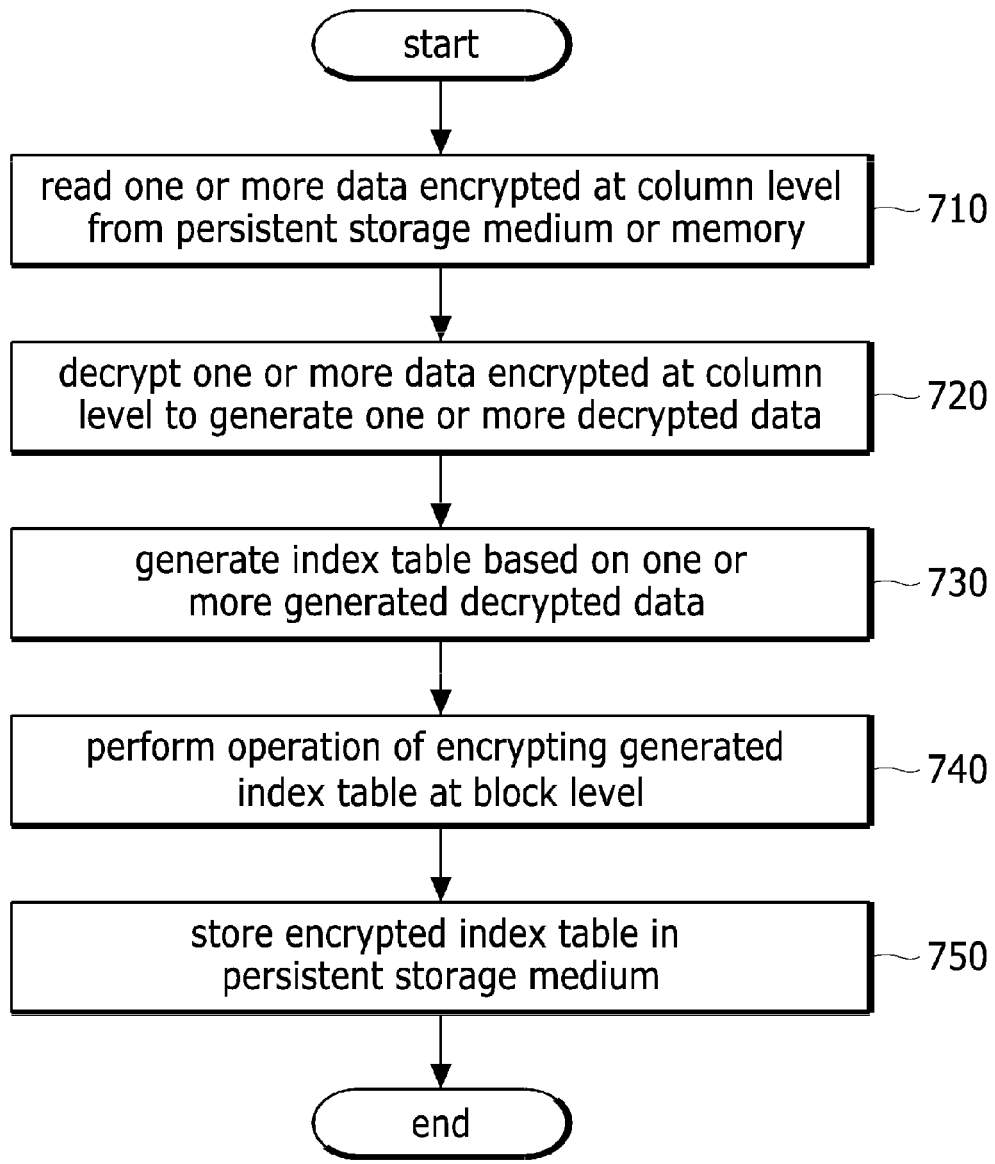

FIG. 7 illustrates an exemplary flowchart for a data storage and index building (alternatively, updating) according to an embodiment of the present invention.

Figure 8:
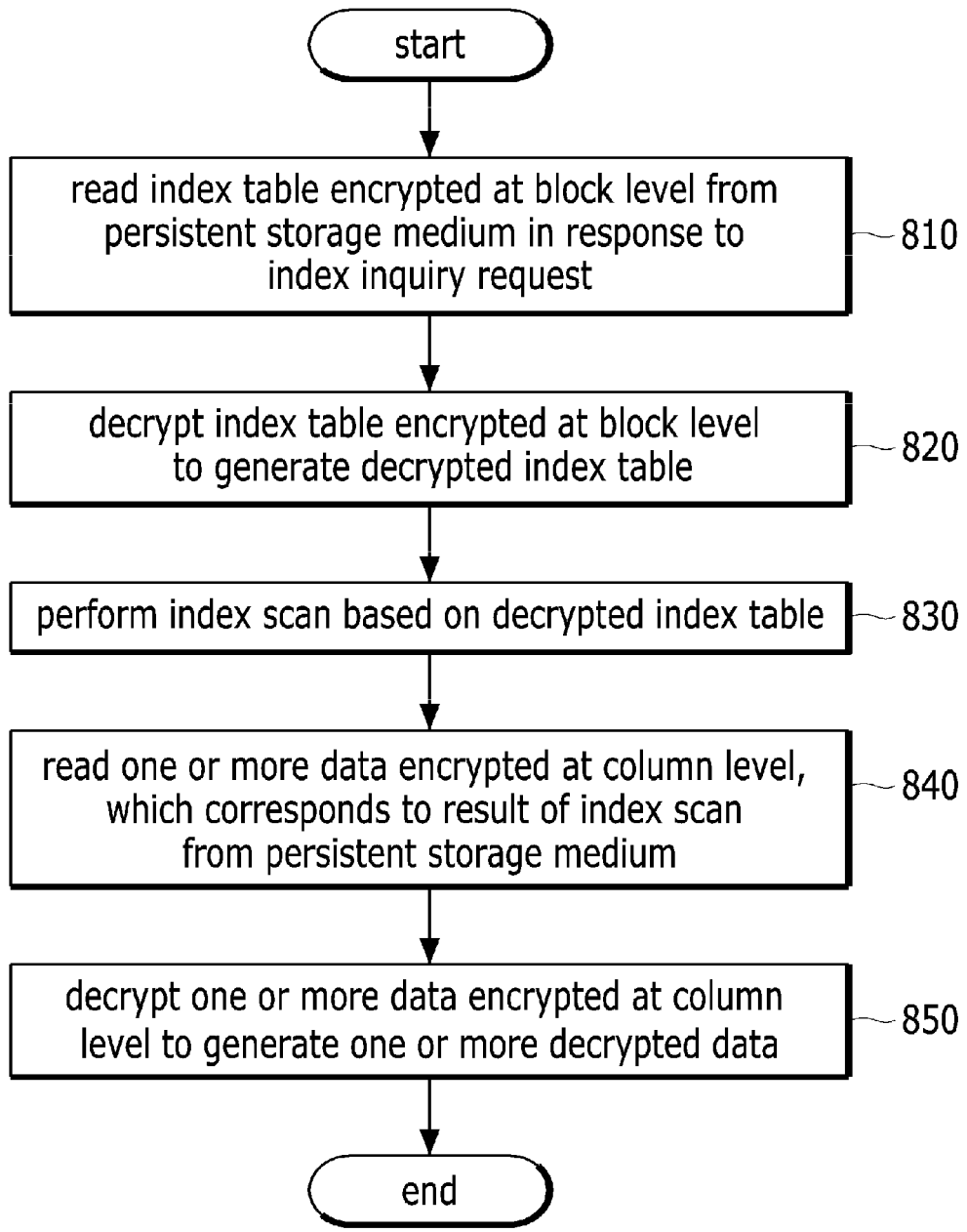

FIG. 8 illustrates an exemplary flowchart for index inquiry according to an embodiment of the present invention.

DETAILED DISCUSSION

Various embodiments and/or aspects will hereinafter be disclosed with reference to drawings. In the following description, multiple concrete details will be disclosed in order to help general understanding of one or more aspects for the purpose of description. However, it will be recognized by those skilled in the art that the aspect(s) can be executed without the concrete details. In the following disclosure and accompanying drawings, specific exemplary aspects of one or more aspects will be described in detail. However, the aspects are exemplary and some equivalents of various aspects may be used, and the descriptions herein are intended to include both the aspects and equivalents thereto.

Further, various aspects and features will be presented by a system which may include multiple devices, components, and/or modules. It should also be recognized that various systems may include additional devices, components, and/or modules and/or various systems may not include all of devices, components, modules, and the like discussed in association with the drawings.

It is not intended that any "embodiment", "example", "aspect", "illustration", and the like used in the specification is preferable or advantageous over any other "embodiment", "example", "aspect", "illustration", and the like. 'Component', 'module', 'system', 'interface', and the like which are terms used below generally mean computer-related entities and may mean, for example, hardware, a combination of hardware and the software, and software.

Moreover, the term 'or' is intended to mean not exclusive "or" but inclusive "or". That is, when not particularly specific or not clear in terms of the context, "X uses A or B" is intended to mean one of natural inclusive substitutions. That is, when X uses A; X uses B; or X uses both A and B, "X uses A or B" may be applied to cover all of them. Further, it should be appreciated that the term "and/or" used in the specification designates and includes all combinations of one or more items of the relevant enumerated items.

Further, the terms "includes" and/or "including" mean that a corresponding feature/or component exists, but it should be appreciated that the terms "include" or "including" mean that presence or addition of one or more other features, components, and/or a group thereof is not excluded. Further, when not particularly specified or not clear in terms of the context as indicating a single form, it should be analyzed that the single form generally means "one or more".

A computer-readable medium in the specification may include all kinds of storage media in which programs and data are stored so as to be readable by a computer system. According to one aspect of the present invention, the medium may include a read only memory (ROM), a random access memory (RAM), a compact disk read only memory (CD-ROM), a digital video disk (DVD)-ROM, a magnetic tape, a floppy disk, an optical data storage device, and the like. Additionally, the medium is distributed in a system connected through a network and may store computer-readable codes and/or commands by a distribution method. A computing device may be a computer, a server, or other similar device.

Prior to describing the detailed content for carrying out the present invention, it should be noted that configurations not directly related to the technical spirit of the present invention are omitted within the scope without departing from the technical spirit of the present invention. Further, terms and words used in the present specification and claims are to be construed as the meaning and concepts meeting the technical spirit of the present invention based on the principle that the inventors can appropriately define the concepts of terms in order to describe their own inventions in the best manner.

FIG. 1 exemplarily illustrates a database system 100 according to an embodiment of the present invention.

As illustrated in FIG. 1, a database server 120 may include, for example, a microprocessor, a main frame computer, a digital single processor, a portable device, and a predetermined-type computer system or computer device such as a device controller.

A client device 110 may mean nodes in the database system having a mechanism for communication through a network. For example, the client device 110 may include a PC, a laptop computer, a workstation, a terminal, and/or a predetermined electronic device having network connectivity. Further, the client device 110 may include a predetermined server implemented by at least one of an agent, an application programming interface (API), and a plug-in.

The database server 120 may include a database management system (DBMS) 130 and a persistent storage medium 140.

Although not illustrated in FIG. 1, the database server 120 may include one or more memories including a buffer cache. Further, although not illustrated in FIG. 1, the database server 120 may include one or more processors. Accordingly, the DBMS 130 may be operated by the processor on the memory.

Herein, the memory may mean a volatile storage device in which stored information is momentarily removed when power is turned off, as a main storage device which the processor directly accesses, such as a random access memory (RAM) such as a dynamic random access memory (DRAM) and a static random access memory (SRAM), but is not limited thereto. The memory may be operated by the processor. The memory may temporarily store a data table including data values. The data table may include the data values, and in the embodiment of the present invention, the data values of the data table are encrypted by a column unit to be stored in the persistent storage medium. In an additional aspect, the memory includes a buffer cache, and data may be stored in a data block of the buffer cache. The data may be recorded in the persistent storage medium 140 by a background process.

The persistent storage medium 140 means a non-volatile storage medium which may persistently store predetermined data, such as a storage device based on a flash memory and/or a battery-backup memory in addition to a magnetic disk, an optical disk, and a magneto-optical storage device. The persistent storage medium 140 may communicate with the processor and the memory of the database server 120 through various communication means. In an additional embodiment, the persistent storage medium 140 is positioned outside the database server 120 to communicate with the database server 120.

The DBMS 130, as a program for permitting performing operations such as retrieving, inserting, correcting, and/or deleting data required for the database server 120, may be implemented by the processor in the memory of the database server 120, as described above.

The client 110 may communicate with the database server 120 through the network. The network according to the embodiment of the present invention may use various wired communication systems such as a public switched telephone network (PSTN), an x digital subscriber line (xDSL), a rate adaptive DSL (RADSL), a multi rate DSL (MDSL), a very high speed DSL (VDSL), a universal asymmetric DSL (UADSL), a high bit rate DSL (HDSL), and a local area network (LAN).

Further, the network proposed in this specification may use various wireless communication systems such as a code division multi access (CDMA), a time division multi access (TDMA), a frequency division multi access (FDMA), an orthogonal frequency division multi access (OFDMA), a single carrier-FDMA (SC-FDMA), and other systems. The techniques described in this specification may be used even in other networks as well as the above-mentioned networks.

FIG. 2 exemplarily illustrates components of a database server 120 according to the embodiment of the present invention.

As illustrated in FIG. 2, the database server 120 according to the embodiment of the present invention may include the persistent storage medium 140 and the DBMS 130. As described above, the DBMS 130 may operate by one or more memories and one or more processors in the database server 120.

The DBMS 130 may include a transceiving module 210, an index management module 220, a data management module 230, an encryption module 240, and a decryption module 250. The respective modules in the DBMS 130 illustrated in FIG. 2 may communicate with each other. The modules of the DBMS 130 are exemplified, and additional modules may be included depending on the implementation, or some of the modules may also be omitted.

The transceiving module 210 may receive data storage, inquiry and index building, an inquiry request, and the like from a user. Further, the transceiving module 210 may also transfer result information regarding the data storage, the inquiry and index building, and the inquiry request.

The index management module 220 may process and manage requests associated with the index building, updating, the storage, and the inquiry. The index management module 220 may include a build module 260 and a scan module 270. The build module 260 may perform operations associated with building of the index and/or updating of the built index. The scan module 270 may perform index scan for a decrypted index table.

The data management module 230 may process and manage requests associated with the storage, and the inquiry of the data. The data management module 230 may include a storage module 280 and an inquiry module 290. The storage module 280 may process and manage a request associated with storage (including update) of data.

The storage module 280 may determine whether a column in which data is to be stored is a column which is designated to be encrypted and whether the column in which the data is to be stored is a column of which an index is set. Furthermore, the storage module 280 may determine to store data and an index table. Further, the storage module 280 may determine storage positions of the encrypted data and/or encrypted index table. For example, the storage module 280 may determine a storage position of the encrypted data on the data table. As another example, the storage module 280 may determine a storage position of the encrypted data on the persistent storage medium 140.

The inquiry module 290 may process and manage a request associated with inquiry (reading) of data. The inquiry module 290 may inquire values of corresponding data based on a column key and a row ID acquired by the index scan in communication with the scan module 270.

The encryption module 240 may perform encryption for the data before recording (storing) the data in the persistent storage medium 140. The encryption module 240 may generate encrypted data (cipher text) based on a plain text. The encryption method for the data in this specification may include column-level encryption and block-level encryption (for example, tablespace-level encryption). The column-level encryption means encrypting the data of the column designated to be encrypted. The block-level encryption means that the encryption for the data is implemented by the block unit, and for example, physical data files generated on an OS system are encrypted by the block unit. In an aspect of the present invention, the column-level encryption may be performed with respect to the data to be stored and the block-level encryption may be performed with respect to the index to be stored. In an additional aspect of the present invention, the block-level encryption may mean that encryption is implemented by the block unit or by the unit of the block or more (a file, a segment, and a table space).

In an additional aspect of the present invention, the encryption module 240 maps an encryption comparison code (for example, hash function) to the encrypted data to store the encryption comparison code mapped to the encrypted data in the persistent storage medium 140. Accordingly, the encryption comparison code and the encrypted data are recorded in the persistent storage medium 140, and as a result, integrity of the data decrypted by the decryption module 250 may be verified through the encryption comparison code.

In one aspect of the present invention, an operation of recording the data (for example, the encrypted data) in the persistent storage medium 140 may be implemented by a background process (for example, a database buffer writer process, a data block writer process, a checkpoint process, and/or a log writer process) of the DBMS 130. In this case, when the encryption module 240 stores the encrypted data in the memory (for example, a buffer cache) (foreground process), the background process may record the encrypted data in the persistent storage medium 140 at a predetermined time. Further, an operation of encrypting the generated index tables at the block level may be performed when the background process intends to record the block in the memory in the persistent storage medium.

In one aspect of the present invention, the encryption module 240 may be positioned throughout a front end layer and a back end layer of the DBMS 130. Further, in an additional aspect of the present invention, the decryption module 250 may be positioned on the back end layer of the DBMS 130.

The decryption module 250 decrypts the encrypted data to generate decrypted data (decipher text) corresponding to the plain text. Additionally, the decryption module 250 may determine whether the decrypted data is the same as the plain text data (that is, integrity verification).

When the data encrypted and recorded in the persistent storage medium 140 is loaded to the memory, the decryption module 250 may decrypt the loaded data. The decryption module 250 may decrypt the corresponding data to correspond to the encryption scheme of the encryption module 240. Further, when the encrypted and recorded data resides in the memory, the decryption module 250 may also decrypt the corresponding data.

In the column-level encryption in the specification, a first encryption key may be generated by the column unit and in the block-level encryption, a second encryption key may be generated by the block unit or by the unit of the block or more (the file, the segment, and the table space), and the first and second encryption keys may have different values. Further, the first encryption key and the second encryption key may be stored in the persistent storage medium or a data dictionary (DD) of the memory (for example, a data dictionary cache). Additionally, the first and second encryption keys may be encrypted through a master key and stored in the data dictionary and the master key may be stored in an external storage medium or the persistent storage medium.

In the decryption scheme according to one aspect of the present invention, a symmetric key may be used, which is the same as the encryption key used when generating the encryption text in the encryption scheme. The encryption/decryption scheme may include, for example, a data encryption standard (DES), an advanced encryption standard (AES), ARIA, Twofish, and SEED, but is not limited thereto. Additionally, as the encryption and decryption schemes according to the aspect of the present invention, a public key encryption scheme having a public key and a private key may be used. The encryption/decryption scheme may include, for example, RSA, ElGamal, oval curve encryption, and knapsack encryption schemes, but is not limited thereto.

In an additional aspect of the present invention, decryption of the index table encrypted by the block unit may be performed when being loaded from the persistent storage medium 140. Further, decryption of the data encrypted at the column level may be performed when intending to access the corresponding data. In the additional aspect of the present invention, the encryption key for the block-level encryption/decryption and the encryption key for the column-level encryption/decryption may be different from each other.

In the additional aspect of the present invention, the encryption module 240 may generate an encrypted data value based on a data value (plain text value). The encryption module 240 may determine an encryption function based on encryption information included in the encryption key and generate the encrypted data value by using the encryption function calculated based on the data value.

The encryption key may at least include information relating to an encryption mode, an encrypted data type, data length information, and the like. The encryption mode may include, for example, the DES, the AES, ARIA, the Twofish, and the SEED described above.

The encryption key may be used in encryption and decryption. The encryption function may include an encryption algorithm which may change the plain text into the cipher text. The encryption function may refer to the encryption key when the encryption and the decryption are performed. The encryption key may be stored inside the database server 120 or outside the database server 120. Further, for additional security, the encryption key may be encrypted and stored through the master key. The master key may have one value which is global with respect to one system. The master key may be stored in the external storage medium or the database server 120. An encryption (decryption) technique according to an aspect of the present invention may be configured in a combination of a variety of encryption algorithms, encryption keys, and/or encryption options (whether an initialization vector is used, and the like).

The encrypted data may be stored in the persistent storage medium 140 together with the encryption comparison code generated at least partially based on one or more data values and positional information on the persistent storage medium 140 in which the data value is to be stored. That is, the encryption comparison code may be used to verify the integrity of the decrypted text. The encryption comparison code may include a hash value generated by using a hash algorithm such as secure hash algorithm (SHA) series and an MD5.

In an additional aspect of the present invention, the hash algorithm may generate the hash value that matches the encrypted data value at least partially based on the data value of the data table and storage positional information of the positional information (for example, positional information in the persistent storage medium) of the data value. Herein, the positional information may include at least one of a row identifier (row ID) and a column key. For example, the row ID may be at least partially based on a position at which the data value is to be written on the data block.

When the hash value is not used, an internal person having valid access authority obtains the encrypted data value to store the encrypted data value at a position different from an original position on the data table. In this case, since the decrypted text of the encrypted data value outputs a valid data value, the database server 120 may not sense modulation of the data. The hash value matches the encrypted data value, and as a result, the database server 120 may sense the modulation of the data. However, in the case where the hash value is simply based on the plain text of the data, when the internal person having the valid access authority obtains the encrypted data value and the hash value matched with the encrypted data value to perform an attack of storing the values at a different storage position, since the decrypted data value is valid, and the hash value based on the decrypted data value is the same as the hash value based on the data value (plain text data value), whether the data is modulated may not be sensed. However, the hash value according to the embodiment of the present invention may be at least partially based on the storage position of the encrypted data. Accordingly, with respect to an attack of changing the storage position of the data described above, since the hash value based on the decrypted data value and the storage position of the decrypted data value is different from the stored hash value, the database server 120 according to the embodiment of the present invention may sense a positional change of the valid encrypted data value.

FIG. 3 illustrates an exemplary flowchart for a data storage and index building process according to an embodiment of the present invention.

Operations in FIG. 3 may be performed by the database server 120. Encryption and decryption operations in FIG. 3 may be transparently and automatically implemented with respect to the client 110.

The order of the flowchart illustrated in FIG. 3 is variable according to the implementation and some steps may be added or some steps may be omitted.

The transceiving module 210 may receive a data storage request (305). Herein, the data storage request may mean a request for writing (including inserting and/or updating) data in a DB. The transceiving module 210 may transfer the corresponding data storage request to the storage module 280 (310).

The storage module 280 may determine whether a corresponding column of a table in which data is to be stored is a column designated to be encrypted according to predetermined (for example, set by a client) schema (315). Further, the storage module 280 may determine whether the corresponding column of the table in which the data is to be stored is a column of which an index is set according to the predetermined schema (320). In one aspect of the present invention, steps S315 and 320 may be independently performed or atomically performed. When the corresponding column of the table in which the data is to be stored is the column designated to be encrypted and the column of which the index is set, the storage module 280 may determine to store the corresponding data in the persistent storage medium 140 and transfer an encryption request for the corresponding data to the encryption module 240 (325).

The encryption module 240 may perform the column-level encryption of the corresponding data based on a predetermined encryption algorithm (330). As described above, the column-level encryption means encrypting a value for predetermined data that belongs to the corresponding column (that is, the column designated to be encrypted). For example, a value for specific data in the column designated to be encrypted may be encrypted in a form such as "%$!G#&".

The encryption module 240 may transfer a request for storing the encrypted data in the persistent storage medium 140 after the encryption is completed (340). For example, the storage request and the encrypted data may be stored in the buffer cache of the memory of the database server 120. Then, for example, the data encrypted at the column level by the background process may be stored in a data segment of the persistent storage medium 140. Accordingly, through the aforementioned process, data encrypted in a transparent scheme with respect to the client may be written in the persistent storage medium 140 in response to a request for writing (including updating) data (350).

In association with the building of the index for the data, referring to FIG. 3, the encryption module 240 may transfer a decryption request for the encrypted data to the decryption module 250 (335). As one example, the encryption of the data in step 330 may be performed at a front end of the database server 120. Therefore, since the index building is performed at the back end of the database server 120, preliminarily encrypted data needs to be decrypted in order to perform the building process of the index.

In one aspect of the present invention, the decryption module 250 may perform the column-level decryption of the corresponding data based on encryption information for the data encrypted at the column level from the encryption module 240 (345). That is, the decryption module 250 decrypts one or more data encrypted at the column level to generate one or more decrypted data.

As described above, for example, in the case of the building of the index (for example, inserting the data), since the decryption module 250 may read information on the encryption data by the encryption module 240 from the memory before the encrypted data is written in the persistent storage medium 140, the decryption module 250 may decrypt the encrypted data acquired from the memory. As another example, in the case of the updating of the index, the decryption module 250 acquires the encrypted data from the persistent storage medium 140 to decrypt the encrypted data. The encryption/decryption scheme may be performed based on the encryption/decryption scheme described in FIG. 2.

Referring back to FIG. 3, the decryption module 250 may transfer an index building request for the decrypted data to the building module 260 (355).

The building module 260 may generate the index table based on the decrypted data (360). In one aspect of the present invention, the building module 260 may generate the index table at least partially based on a size attribute for a column in which one or more decrypted data are to be stored. Further, the building module 260 may build the index table based on at least one of a balanced tree (B-tree) index technique, a bitmap index technique, and a function based index (FBI) technique.

In one aspect of the present invention, the building module 260 may transfer the encryption request for the built index table to the encryption module 240 after the index building is completed (365).

The encryption module 240 may perform the block-level (for example, tablespace-level) encryption for the built index table (370). Then, the encryption module 240 may transfer a disk storage request for the index table encrypted at the block level (375). Then, for example, the index table encrypted at the block level by the background process may be stored in an index segment of the persistent storage medium 140. Accordingly, through the aforementioned scheme, an encrypted index table of which index range scan may be permitted may be built.

In an additional embodiment of the present invention, when a data update request is received, the database server 120 may implement data update and index update through the index building process illustrated in FIG. 3 after performing an index scan and/or index inquiry process to be described below in association with FIG. 4.

FIG. 4 illustrates an exemplary flowchart for an index scan and inquiry process according to an embodiment of the present invention.

Operations in FIG. 4 may be performed by the database server 120. Encryption and decryption operations in FIG. 4 may be transparently and automatically implemented with respect to the client device 110.

The order of the flowchart illustrated in FIG. 4 is variable according to the implementation and some steps may be added or some steps may be omitted.

The transceiving module 210 may receive an index inquiry request (405). The index inquiry request may be, for example, an index range scan request. The transceiving module 210 may transfer the index inquiry request to the scan module 270 (410).

The scan module 210 may process the index inquiry request. Further, the scan module 270 may transfer the index scan request so that the encrypted index table is loaded to the memory from the persistent storage medium 140 (415). Transferring the index scan request may be integrated into one process.

In response to the index scan request, the index table encrypted at the block level may be loaded from the persistent storage medium 140 to the decryption module 250 (420). The encrypted index table may be loaded by the block unit from the persistent storage medium 140.

The decryption module 250 decrypts the index table encrypted at the block level to generate the decrypted index table (425). The decryption module 250 may transfer the decrypted index table to the scan module 270.

The scan module 270 may perform index scan for the decrypted index table (435). The index scan in the specification may mean a process that scans the index in order to find the column key and/or the row ID for the index. Further, index inquiry in the specification may mean a process that finds a value (that is, record) of data corresponding to the row ID of the column in the scanned index.

The scan module 270 may transfer an index scan result to the inquiry module 290 (440). Then, the inquiry module 290 may generate and transfer a data value inquiry request depending on a value (that is, the column key and the row ID) of the index scan result (445).

In this case, the data encrypted at the column level may be loaded from the persistent storage medium 140 (450). The decryption module 250 may decrypt the data encrypted at the column level (455). The decrypted data may be transferred to the inquiry module 290 (460). Further, the inquiry module 290 may generate a result value for index inquiry and transfer the generated result value to the transceiving module 210.

In an additional aspect of the present invention, in the case of the process for the index update, the index scan process (for example, steps 405 to 435) may be performed after step 320 in FIG. 3 as described above.

In an additional aspect of the present invention, when the indexed table includes all of the encrypted columns, the index table encrypted at the block level is decrypted, and as a result, the index scan and the index inquiry may be completed.

As described above, since the encryption/decryption is not made by the column unit and the encryption/decryption is made by the block unit with respect to the index table, securing the data may be maintained and the index range scan may be efficiently performed. In the case of the encryption/decryption scheme according to one aspect of the present invention, single key search, range search, and composite key search for a secured database may be permitted.

FIG. 5 illustrates an exemplary flowchart for a data inquiry process according to an embodiment of the present invention.

Operations in FIG. 5 may be performed by the database server 120. Decryption operations in FIG. 5 may be transparently and automatically implemented with respect to the client 110.

An order of the flowchart illustrated in FIG. 5 is variable according to the implementation and some steps may be added or some steps may be omitted.

As illustrated in FIG. 5, the transceiving module 210 may, for example, receive the data inquiry request from the client (510). The transceiving module 210 may transfer the data inquiry request to the inquiry module 290 (520).

The inquiry module 290 processes the inquiry request to transfer the data inquiry request so that the encrypted data corresponding to the inquiry request is loaded from the persistent storage medium 140 (530).

Then, the data encrypted at the column level, which corresponds to the inquiry request may be loaded (540). The decryption module 250 decrypts the data encrypted at the column level to generate the decrypted data (550). The decryption module 250 may transfer the decrypted data to the inquiry module 290 (560).

The inquiry module 290 processes (alternatively, does not process) the decrypted data to generate the data inquiry result value and thereafter, transfer the data inquiry result value to the transceiving module 210 (570).

FIG. 6 exemplarily illustrates an encryption scheme in which data and indexes are encrypted and stored in a persistent storage medium 140 according to an embodiment of the present invention.

As illustrated in FIG. 6, the persistent storage medium 140 may include a data segment (alternatively, table segment) 610 and an index segment 620. Herein, the data segment is an area in which the data table may be stored and the index segment is an area in which the index table may be stored. That is, different areas of the persistent storage medium 140 may be allocated according to whether an object is the (data) table or the index.

According to one aspect of the present invention, the block-level encryption may be performed with respect to the index table and the column-level encryption may be performed with respect to the data table.

According to one aspect of the present invention, when the data encrypted at the column level and the index encrypted at the block level are loaded to the DBMS 130 (that is, the memory) from the persistent storage medium 140, the decryption may be automatically performed. Further, when the data and the index are stored in the persistent storage medium 140 from the DBMS 130 (that is, the memory), the encryption may be automatically performed. Accordingly, security management in a transparent scheme may be valid with respect to the client through the aforementioned technical features.

Since the data to which the column-unit encryption is applied is stored in the data segment 610, columns for a name and a date of birth may not be encrypted and only a column for a credit card number may be encrypted. Further, since the index table to which the block-unit encryption is applied is stored in the index segment 620, the entirety of the index table may be encrypted and stored as illustrated in FIG. 6.

FIG. 7 illustrates an exemplary flowchart for data storage and index building (alternatively, updating) according to an embodiment of the present invention.

Operations in FIG. 7 may be performed by the database server 120. Encryption and decryption operations in FIG. 7 may be transparently and automatically implemented with respect to the client 110.

The order of the flowchart illustrated in FIG. 7 is variable according to the implementation and some steps may be added or some steps may be omitted.

The database server 120 may read one or more data encrypted at the column level from the persistent storage medium or the memory (710). That is, the column-level encryption may mean column-unit encryption for selected data.

Then, the database server 120 decrypts one or more data encrypted at the column level to generate one or more decrypted data (720). The reason is that the index range scan becomes invalid when the index table is generated based on the encrypted data in generating the index table. That is, the index table may be generated based on the decrypted data (that is, the plain text data) in order to permit the index range scan and maintain the security for the index (730).

As illustrated in FIG. 7, the database server 120 may encrypt the generated index table at the block level (740). That is, since the index table is generated based on the decrypted data, the index table may be encrypted at the block level in order to maintain the security for the corresponding index table.

Then, the database server 120 may store the encrypted index table in the persistent storage medium 140 (750).

That is, less data tables are encrypted (consequently, the speed also increases) in the encryption technique according to one aspect of the present invention than in the technique that encrypts both the data table and the index table at the tablespace level. Moreover, in the encryption/decryption technique according to one aspect of the present invention, the index range scan is valid with respect to the data table as compared with the technique (the index table is not separately encrypted) that encrypts the data table by the column unit. Furthermore, since the index table is encrypted at the block level in the case of the encryption/decryption technique according to one aspect of the present invention, a size attribute value for the column stored in the index table is not exposed, and as a result, higher-level security management may be valid.

FIG. 8 illustrates an exemplary flowchart for index inquiry according to an embodiment of the present invention.

Operations in FIG. 8 may be performed by the database server 120. Encryption and decryption operations in FIG. 8 may be transparently and automatically implemented with respect to the client 110.

The order of the flowchart illustrated in FIG. 8 is variable according to the implementation and some steps may be added or some steps may be omitted.

The database server 120 may retrieve the index table encrypted at the block level from the persistent storage medium 140 in response to the index inquiry request (for example, the index range scan request) (810). Then, the database server 120 decrypts the index table encrypted at the block level to generate the decrypted index table (820).

The database server 120 may perform the index scan based on the decrypted index table (830). That is, since the index scan is performed based on the decrypted index table, the index table depending on data which is not encrypted may be acquired. Accordingly, the database server 120 may acquire a result (for example, the column key and the row ID) depending on the index scan.

The database server 120 may retrieve one or more data encrypted at the column level, which may correspond to the result depending on the index scan, from the persistent storage medium (840). Then, the database server 120 decrypts one or more data encrypted at the column level to generate one or more decrypted data (850). Accordingly, the decrypted data value (record) is read to generate the result value for the index inquiry request.

Therefore, the encryption/decryption scheme (that is, a combination of the column-level encryption and the block-level encryption) may enable efficient protection of data while permitting the index range scan.

Those skilled in the art of the present invention will appreciate that various exemplary logic blocks, modules, processors, means, circuits, and algorithm steps can be implemented by electronic hardware, various types of programs or design codes (designated as "software" herein for easy description), or a combination thereof. In order to clearly describe the intercompatibility of the hardware and the software, various exemplary components, blocks, modules, circuits, and steps have been generally described above in association with functions thereof. Whether the functions are implemented as the hardware or software depends on design restrictions given to a specific application and an entire system. Those skilled in the art of the present invention may implement functions described by various methods with respect to each specific application, but it should not be analyzed that the implementation determination departs from the scope of the present invention.

Various embodiments presented herein may be implemented as manufactured articles using a method, an apparatus, or a standard programming and/or engineering technique. The term "manufactured article" includes a computer program, a carrier, or a medium which is accessible by a predetermined computer-readable device. For example, a computer-readable medium includes a magnetic storage device (for example, a hard disk, a floppy disk, a magnetic strip, or the like), an optical disk (for example, a CD, a DVD, or the like), a smart card, and a flash memory device (for example, an EEPROM, a card, a stick, a key drive, or the like), but is not limited thereto. Further, various storage media presented herein include one or more devices and/or other machine-readable media. The term "machine-readable media" include a wireless channel and various other media that can store, possess, and/or transfer command(s) and/or data, but are not limited thereto.

It will be appreciated that a specific order or a hierarchical structure of steps in the presented processes is one example of exemplary accesses. It will be appreciated that the specific order or the hierarchical structure of the steps in the processes within the scope of the present invention may be rearranged based on design priorities. Appended method claims provide elements of various steps in a sample order, but it does not mean that the method claims are limited to the presented specific order or hierarchical structure.

The description of the presented embodiments is provided so that those skilled in the art of the present invention use or implement the present invention. It will be apparent to those skilled in the art that various modifications of the embodiments can be made and general principles defined herein can be applied to other embodiments without departing from the scope of the present invention. Therefore, the present invention is not limited to the embodiments presented herein, but should be analyzed within the widest range which is consistent with the principles and new features presented herein.

The invention claimed is:

1. A non-transitory computer readable medium having a program for security management in a database to allow a computing device to perform steps including:
   reading one or more data encrypted at a column level from any of a persistent storage medium or a memory;
   decrypting one or more data encrypted at the column level to generate one or more decrypted data;
   generating an index table based on the one or more generated decrypted data; and
   performing an operation of encrypting the generated index table at a block level,
      where the instructions for the program are executed by one or more processors in the computing device,
      wherein, in a column-level encryption, a first encryption key is generated by a column unit and, in a block-level encryption, a second encryption key is generated by a block unit or by a unit of the block or more, and wherein the first encryption key and the second encryption key are encrypted through a master key to be stored in a data dictionary of a memory, and the master key is stored in any of an external storage medium or a database server.

2. The non-transitory computer readable medium of claim 1,
   wherein the steps further include: storing the index table encrypted at the block level in the persistent storage medium.

3. The non-transitory computer readable medium of claim 1,
   wherein the operation of encrypting the generated index table at the block level is performed when a background process intends to write the block in the memory in the persistent storage medium.

4. The non-transitory computer readable medium of claim 1,
   wherein the steps further include:
      receiving a storage request for the one or more data;
      determining whether a column in which the one or more data are to be stored is an encrypted column and whether the column in which the one or more data are to be stored is a column of which an index is set; and
      encrypting and storing the one or more data at the column level when the column in which the one or more data are to be stored is the encrypted column and the column in which the one or more data are to be stored is the column of which the index is set.

5. The non-transitory computer readable medium of claim 4,
   wherein the encrypting and storing of the one or more data at the column level includes storing the one or more data encrypted at the column level in a data segment of the persistent storage medium.

6. The program non-transitory computer readable medium of claim 4,
   wherein the first and second encryption keys have different values.

7. The non-transitory computer readable medium of claim 1,
   wherein the steps further include: storing the index table encrypted at the block level in an index segment of the persistent storage medium.

8. The non-transitory computer readable medium of claim 1,
   wherein the generating of the index table includes generating the index table at least partially based on a size attribute for a column in which the one or more decrypted data are to be stored.

9. The non-transitory computer readable medium of claim 1,
   wherein the generating of the index table is performed based on at least one of a balanced tree (B-tree) index technique, a bitmap index technique, and a function based index (FBI) technique.

10. The non-transitory computer readable medium of claim 1,
    wherein the encryption and decryption are transparently and automatically performed with respect to a client of the database server.

11. The non-transitory computer readable medium of claim 1,
    wherein one or more data encrypted at the column level are stored in the persistent storage medium together with an encryption comparison code generated at least partially based on the one or more data values and positional information in which the data values are to be stored.

12. The non-transitory computer readable medium of claim 1, wherein the steps further include:
    encrypting and storing the one or more data at the column level,
       wherein the column in which the one or more data are to be stored is an encrypted column and a column in which an index is set.

13. A non-transitory computer readable medium storing a program for security management in a database to allow a computing device to perform steps including:
    reading an index table encrypted at a block level from a persistent storage medium in response to an index inquiry request;
    decrypting the index table encrypted at the block level to generate the decrypted index table;
    performing index scan based on the decrypted index table;
    reading one or more data encrypted at a column level corresponding to a result of the index scan, from the persistent storage medium; and decrypting one or more data encrypted at the column level to generate one or more decrypted data, where the instructions for the program are executed by one or more processors in the computing device, and wherein, in a column-level encryption, a first encryption key is generated by a column unit and, in a block-level encryption, a second encryption key is generated by a block unit or by a unit of the block or more, and wherein the first encryption key and the second encryption key are encrypted through a master key to be stored in a data dictionary of a memory, and the master key is stored in any of an external storage medium or a database server.

14. The non-transitory computer readable medium of claim 13, wherein the index scan result includes a column key and a row ID corresponding to the index inquiry request.

15. The non-transitory computer readable medium of claim 13, wherein the steps further include: generating an index inquiry result value corresponding to the index inquiry request based on one or more decrypted data.

16. A database server having a program for security management, comprising:

at least one hardware processor and a memory configured for reading an index table encrypted at a block level from a persistent storage medium in response to an index inquiry request, decrypting the index table encrypted at the block level to generate the decrypted index table, performing index scan based on the decrypted index table, reading one or more data encrypted at a column level corresponding to a result of the index scan, from the persistent storage medium, and decrypting one or more data encrypted at the column level to generate one or more decrypted data; and a persistent storage medium configured to store a data table including the data encrypted at the column level and an index table encrypted at the block level, wherein, in a column-level encryption, a first encryption key is generated by a column unit and in a block-level encryption, a second encryption key is generated by a block unit or by a unit of the block or more, and wherein the first encryption key and the second encryption key are encrypted through a master key to be stored in a data dictionary, and the master key is stored in any of an external storage medium or the database server, where any software portions of the program are stored in the memory.

17. The database server of claim 16, further comprising:

the at least one processor further configured to generate the index table based on the one or more decrypted data, and to perform an operation of encrypting the generated index table at the block level.

* * * * *